US012573968B2

(12) United States Patent
Fassnacht

(10) Patent No.: US 12,573,968 B2
(45) Date of Patent: Mar. 10, 2026

(54) CONTROL CIRCUIT FOR AN ELECTRIC MACHINE, ELECTRIC DRIVE SYSTEM, AND METHOD FOR DECELERATING AN ELECTRIC MACHINE

(71) Applicant: Robert Bosch GmbH, Stuttgart (DE)

(72) Inventor: Jochen Fassnacht, Calw (DE)

(73) Assignee: Robert Bosch GmbH, Stuttgart (DE)

( * ) Notice: Subject to any disclaimer, the term of this patent is extended or adjusted under 35 U.S.C. 154(b) by 80 days.

(21) Appl. No.: 18/255,470

(22) PCT Filed: Nov. 24, 2021

(86) PCT No.: PCT/EP2021/082780
§ 371 (c)(1),
(2) Date: Jun. 1, 2023

(87) PCT Pub. No.: WO2022/122382
PCT Pub. Date: Jun. 16, 2022

(65) Prior Publication Data
US 2024/0022187 A1     Jan. 18, 2024

(30) Foreign Application Priority Data
Dec. 10, 2020     (DE) ..................... 10 2020 215 604.2

(51) Int. Cl.
*H02P 3/22*          (2006.01)
*B60L 7/22*          (2006.01)
(Continued)

(52) U.S. Cl.
CPC ................ *H02P 3/22* (2013.01); *H02P 27/06* (2013.01); *H02P 29/68* (2016.02); *B60L 7/22* (2013.01);
(Continued)

(58) Field of Classification Search
CPC .... B60L 2210/30; B60L 2210/40; B60L 7/22; B60L 2240/421; B60L 2240/54;
(Continued)

(56) References Cited

U.S. PATENT DOCUMENTS 3,890,551 A * 6/1975 Plunkett .................... H02P 3/22
                                                                318/376
7,088,073 B2 * 8/2006 Morishita ............... H02P 25/16
                                                                318/800
(Continued)

FOREIGN PATENT DOCUMENTS

CN          101100170 A     1/2008
CN          111564836 A     8/2020
(Continued)

OTHER PUBLICATIONS

Translation of International Search Report for Application No. PCT/EP2021/082780 dated Mar. 2, 2022 (2 pages).

*Primary Examiner* — Thai T Dinh
(74) *Attorney, Agent, or Firm* — Michael Best & Friedrich LLP

(57)          ABSTRACT

The invention relates to a circuit assembly for better decelerating a rotating electric machine by means of a three-point inverter. For this purpose, an electrical resistor is supplied between a central terminal and an outer terminal of the three-point inverter. This electrical resistor allows some of the electrical energy generated during the deceleration of the electric machine to be converted into thermal energy as needed.

11 Claims, 3 Drawing Sheets

(51) Int. Cl.
    *H02P 27/06*     (2006.01)
    *H02P 29/68*     (2016.01)
(52) U.S. Cl.
    CPC ....... *B60L 2210/30* (2013.01); *B60L 2210/40*
        (2013.01); *B60L 2240/421* (2013.01); *B60L*
        *2240/54* (2013.01); *B60L 2240/545* (2013.01)
(58) Field of Classification Search
    CPC ...... B60L 2240/545; H02P 3/22; H02P 27/06;
                          H02P 29/68
    See application file for complete search history.

(56) References Cited

U.S. PATENT DOCUMENTS 7,301,301 B2 * 11/2007 Nagatsuka .............. B60L 50/00
                                    318/811
9,225,268 B2 * 12/2015 Nagatsuka ................ B60L 3/00

10,632,859 B2 * 4/2020 Beulich .................... B60K 6/28
10,958,188 B1 * 3/2021 Simms ..................... H02P 3/22
2004/0145337 A1 * 7/2004 Morishita ............ H02M 7/487
                                  318/801
2006/0245216 A1 * 11/2006 Wu ..................... H02M 7/4833
                                  363/13
2014/0368134 A1 * 12/2014 Nagatsuka ................ B60L 9/22
                                  318/380
2016/0099654 A1 * 4/2016 Viitanen ............ H02M 5/4585
                                  363/37
2016/0308474 A1 * 10/2016 Millett .................... B66B 1/302
2019/0193581 A1 * 6/2019 Beulich .................. B60L 50/75

FOREIGN PATENT DOCUMENTS

DE     102011085347 A1     5/2013
EP          2768128 A1     8/2014
JP       2011166954 A     8/2011

* cited by examiner

CONTROL CIRCUIT FOR AN ELECTRIC MACHINE, ELECTRIC DRIVE SYSTEM, AND METHOD FOR DECELERATING AN ELECTRIC MACHINE

BACKGROUND

The present invention relates to a control circuit for an electric machine and an electric drive system having such a control circuit. Furthermore, the present invention relates to a vehicle having an electric drive system comprising such a control circuit. Furthermore, the present invention relates to a method of decelerating an electric machine.

Fully or at least partially electrically driven vehicles comprise an electric drive system having an electric machine. For driving the vehicle, this electric machine can drive the vehicle during the engine mode by way of electrical energy from a power source, such as a traction battery. Moreover, the electric machine can also operate in a generator mode in order to convert kinetic energy of the vehicle into electrical energy. For example, this electrical energy can charge the traction battery of the vehicle.

Publication DE 10 201 1085 347 A1 describes a method for controlling an electric machine of a motor vehicle, wherein the electric machine is configured so as to supply drive power and recuperation. A current driving state is evaluated in order to determine a current recuperation.

In addition, currently available electric vehicles are equipped with a mechanical decelerating system.

SUMMARY

The present invention creates a control circuit for an electric machine, an electric drive system, an electric vehicle, and a method for decelerating an electric.

Accordingly, the following is supplied:

A control circuit for an electric machine having an electrical resistor and a three-point inverter. The three-point inverter comprises a DC voltage terminal and an AC voltage terminal. The DC voltage filament has a first connection point, a second connection point and a central connection. The electrical resistor is arranged between the central terminal and the first terminal. The three-point inverter is configured so as to be connected to an electric machine at the AC voltage terminal. Furthermore, the three-point inverter is configured so as to be connected to a DC voltage source at the DC voltage terminal between the central terminal and the second terminal of the DC voltage terminal.

The following is furthermore provided:

An electric drive system having a control circuit according to the present invention and an electric machine. The electric machine is electrically coupled to the AC voltage terminal of the control circuit.

In addition, the following is provided:

An electric vehicle having a control circuit according to the present invention for an electric machine, in particular with an electric drive system according to the present invention.

Finally, the following is provided:

A method for decelerating an electric machine. The method comprises a step for supplying a control circuit according to the present invention. Furthermore, the method comprises a step of rectifying an AC voltage supplied by the electric machine at the AC voltage terminal and a step of supplying the rectified AC voltage at the DC voltage terminal of the control circuit. In particular, at least some of the electrical energy of the rectified AC voltage is supplied at an electrical resistor between the central terminal and the first connection point.

The present invention is based on the finding that, when decelerating an electric machine in generator mode, the deceleration torque in a base speed range is significantly greater than in the field attenuation range. In particular, the deceleration torque in the field attenuation range decreases significantly with the speed so that a limited decelerating effect can be achieved, in particular at high speeds.

It is therefore an idea of the present invention to take this finding into account and to supply a control circuit for an electric machine, which can decelerate the electric machine even at high speeds with as great a decelerating effect as possible. In particular, it is an idea of the present invention to supply an inverter for the control circuit of the electric drive system, which inverter can cover a voltage range which, for the deceleration of the electric machine in the recuperation mode, higher than the electric voltage of the DC voltage source which powers the drive system in the engine mode. According to the present invention, a so-called three-point inverter or three-level inverter is provided for this purpose. The electric voltage supplied by the DC voltage source is not supplied between the outer terminals of the inverter, but rather between a central terminal and an outer terminal of the inverter. In addition, an electrical resistor, a so-called chopper resistor, is supplied between the further outer terminal and the central terminal of the inverter. This additional resistor can be used in order to convert some of the electrical energy into thermal energy in the deceleration mode, in particular at high engine speeds. Thus, together with the electrical energy which is fed back into the DC voltage source during the deceleration operation, a significantly higher electrical voltage can be output between the two outer terminals of the three-point inverter. A significantly higher deceleration torque can thereby be achieved, in particular at high speeds of the electric machine to be decelerated.

The three-point inverter can be in particular a so-called three-level NPC (neutral point clamped) inverter. Because the general structure and operation of such inverters is well known to the person skilled in the art, a detailed description is omitted here.

As already described above, by using a chopper resistor between the central terminal and an outer terminal of the three-point inverter, a significantly higher deceleration torque can be achieved, in particular at higher speeds, in conjunction with the feeding of electrical energy into the DC voltage source. As a result, it may be possible to achieve sufficiently high deceleration torque over the entire conceived operating range of the electric machine, such that additional mechanical deceleration systems can be omitted in whole or in part, for example in electric vehicles.

According to one embodiment, the control circuit further comprises a switching element. The switching element can be arranged in an electrical path between the first connection point and the electrical resistor. For example, the switching element can be a semiconductor switching element, such as a MOSFET or bipolar transistor with an insulated-gate bipolar transistor (IGBT). The corresponding intermediate circuit voltage can be stabilized by controlled or regulated actuation of this switching element. Accordingly, the actuation of the switching elements in the three-point inverter can be focused on setting a required (deceleration) torque on the electric machine. The regulation of the three-point inverter can thus be significantly simplified. The setting of the corresponding intermediate circuit voltage can be carried out, for example, by a pulse width-modulated actuation of the switching element.

According to one embodiment, the control circuit comprises at least one diode. The at least one diode can be arranged in an electrical path between the first connection point and the electrical resistor. In particular, a suitable number of diodes can be supplied between the electrical resistor and the first connection point of the DC voltage terminal in order to maintain a minimum intermediate circuit voltage. This has the advantage that, in the normal mode of the control circuit, there is a minimum intermediate circuit voltage, which leads to the reliable blocking of diodes of the three-point inverter during normal mode.

According to one embodiment, control circuit further comprises a control device. The control device is configured so as to supply electrical energy in a recuperating operation from the AC voltage terminal at least partially at the electrical resistor between the central terminal and the first connection point of the DC voltage terminal. The control device can also simultaneously feed electrical energy into the DC voltage source between the central terminal and the second connection point. Thus, between the first connection point and the second connection point, i.e. the outer terminals of the three-point inverter, there arises an electrical voltage, which can be higher than the electrical voltage of the connected DC voltage source. In this way, the deceleration power on the connected electric machine can be significantly improved, in particular at higher speeds. This is also achieved in that only some of the deceleration energy must be stored in the battery and some of the resistance can be converted into thermal energy, which offers the advantage that the battery does not have to be over-designed for the rarely occurring stronger decelerating maneuvers.

According to one embodiment, the control device is configured so as to transfer electrical energy from the AC voltage terminal to the electrical resistor if a rotation speed of an electric machine connected at the AC voltage terminal is greater than a predetermined limit value. For example, this predetermined limit value for the speed can correspond to a limit speed at which, in a conventional actuation without the chopper resistor according to the invention, the electric machine would be actuated in the field attenuation range. Moreover, the predetermined speed at which at least some of the electrical energy is converted into thermal energy over the chopper resistor between the central terminal and the first connection point of the DC voltage terminal can also be dynamically adjustable. In particular, the speed limit can be adjusted based on, for example, operating parameters of the electric machine, the inverter, and/or the DC voltage source.

The control device is configured so as to sense at least one operating parameter of a battery connected between the central terminal and the second connection point of the DC voltage terminal. In this case, the control device can further be configured so as to adjust an electrical voltage over the electrical resistor using the at least one operating parameter of the battery.

In particular, the at least one operating parameter can comprise a charge state or a temperature of the battery. In this way, for example, even if the charging power is limited due to the charge state or the temperature, a high decelerating power of the electric machine can be achieved. For this purpose, the corresponding electrical energy can be converted into thermal energy over the chopper resistor between the central terminal and the first connection point of the DC voltage terminal, rather than being fed into the DC voltage source.

The described configurations and further developments can be combined with one another as desired, where appropriate. Further configurations, further developments and implementations of the invention also include not explicitly mentioned combinations of features of the invention described above or in the following with respect to the embodiment examples. Those skilled in the art will in particular also add individual aspects as improvements or additions to the respective basic forms of the invention.

BRIEF DESCRIPTION OF THE DRAWINGS

Further features and advantages of the invention are explained in the following with reference to the figures.

DETAILED DESCRIPTION

Figure 1:
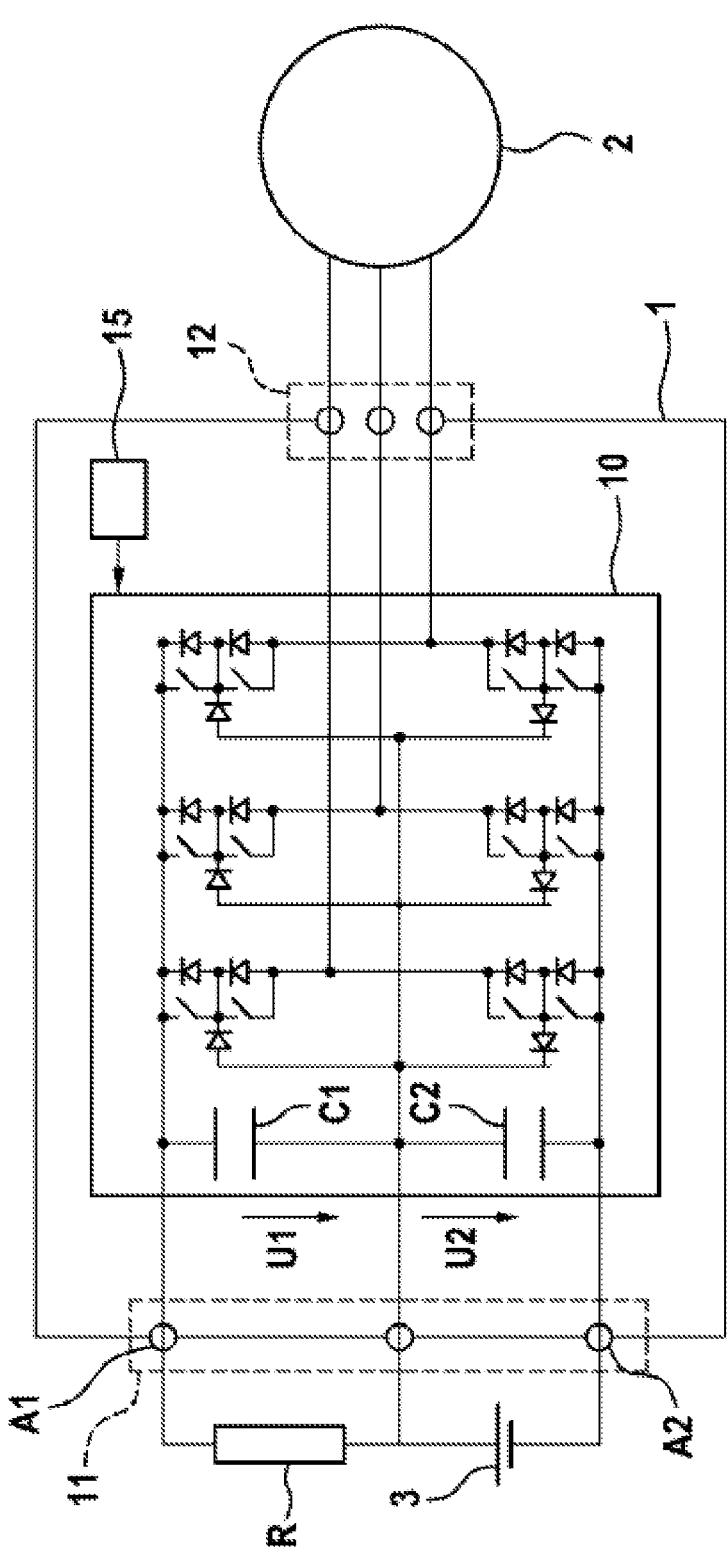
FIG. 1 provides an example illustration of a schematic view of a schematic view of a basic circuit diagram of an electric drive system having a control circuit for an electric machine according to one embodiment.

FIG. 1 shows a schematic view of a basic circuit diagram of an electric drive system according to one embodiment. The electric drive system comprises an electric machine 2. The electric machine 2 can be driven by a control circuit 1. For this purpose, the control circuit 1 comprises an inverter, in particular a three-point inverter 10. The inverter 10 is electrically connected to the electric machine 2 at an AC voltage terminal 12. Furthermore, the inverter 10 is connected to a DC voltage source 3, for example a battery, at a DC voltage terminal 11. For example, the electric drive system can be the electric drive system of an electric vehicle. Accordingly, the DC voltage source 3 can be the traction battery of the electric vehicle.

The DC voltage converter 10 can be a three-point inverter, in particular a three-point NPC (neutral point clamped) inverter. The embodiment of the inverter shown in FIG. 1 is a three-phase inverter for connecting a three-phase electric machine 2. However, the present invention is not limited to such three-phase embodiments. Moreover, the basic principle of the present invention can also be adjusted for any other number of electrical phases for the inverter 10 as well as the electric machine 2. The basic design as well as the functionality of a three-point inverter are known to the person skilled in the art and is therefore not explained in further detail at this point.

The DC voltage terminal 11 of the three-point inverter 10 comprises a central terminal M as well as a first connection point A1 and a second connection point A2. The two connection points A1 and A2 are connected to an outer terminal of the inverter 10. Furthermore, the three-point inverter 10 comprises a first intermediate circuit capacitor C1 between the central terminal M and the first connection point A1, as well as a second intermediate circuit capacitor C2 between the central terminal and the second connection point A2.

The control circuit 1 of the electric drive system of this embodiment example further comprises an electrical resistor R. The electrical resistor R is connected at a first terminal to the first connection point A1 of the DC voltage terminal 11. A second terminal of the electrical resistor R is connected to the central terminal M of the DC voltage terminal 11.

In addition, between the central terminal and the second connection point A2, a DC voltage source 3 can be connected, for example a traction battery of an electric vehicle.

To drive the electric machine 2, a DC voltage source 3 connected to the DC voltage terminal 11 of the inverter 10 can supply electrical energy, which supplies an AC voltage by driving the switching elements in the inverter 10 at the AC voltage terminal 12. This AC voltage then drives the electric machine 2 connected to the AC voltage terminal 12. By contrast to a conventional circuit assembly, however, no external voltage is supplied between the central terminal M and the first connection point A1.

In order to decelerate a rotating electric machine 2, the electric machine 2 can be operated as a generator, for example. In this case, an AC voltage supplied by the electric machine 2 to the AC voltage terminal 12 of the inverter 10 is rectified by means of the inverter 10 and supplied at the DC voltage terminal 11. For example, a DC voltage can be supplied between the central terminal M and the second connection point A2 of the DC voltage terminal 11, which feeds electrical energy into the DC voltage source 3, for example the traction battery of an electric vehicle. In this case, the amount of the electric voltage between the central terminal M and the second connection point A2 of the DC voltage terminal 11 is limited by the properties of the DC voltage source 3. At higher speeds of the electric machine 2, the electric machine 2 would therefore have to be operated in a field attenuation range by the DC voltage source 3 due to the voltage specifications. This limits the maximum achievable limit power on the electric machine 2.

To increase the deceleration power, therefore, a voltage can be supplied between the first connection point A1 and the second connection point A2 through suitable actuation of the switching elements in the inverter 10 at the DC voltage terminal 11, which voltage is higher than the maximum permissible voltage that can be fed into the DC voltage source 3. In this case, the electric voltage at the DC voltage terminal 11 can be divided between the DC voltage source 3 at the central terminal M and the second connection point A2 and the electrical resistor R at the central terminal M and the first connection point A1. Thus, some of the electrical energy on the DC voltage terminal 11 is converted into thermal energy over the electrical resistor R. The remaining portion of the electrical energy can continue being fed into the DC voltage source 3. In this way, a high decelerating power can be achieved even at higher speeds of the electric machine 2. The size of the chopper resistor is to be chosen appropriately for this purpose.

The electric machine 2 as well as the three-point inverter 10 must be designed for the higher voltages required in order to achieve the higher decelerating power. However, the high electrical voltages and associated powers occur only during deceleration of the electric machine 2. In normal mode, on the other hand, the electric machine 2 is only driven using the DC voltage supplied by the DC voltage source 3.

The actuation of the switching elements in the three-point inverter 10 can occur, for example, by means of a suitable control device 15.

For example, the actuation of the individual switching elements can take place based on a suitable space vector modulation or the like. For driving the electric machine 2 in normal mode, the switching elements can be actuated in a conventional manner, for example using the DC voltage supplied by the DC voltage source 3 between the central terminal M and the second connection point A2, in order to set a desired torque or a desired speed on the electric machine 2.

To decelerate the electric machine 2, the electrical energy supplied by the electric machine 2 at the AC voltage terminal 12 can be converted into a DC voltage by the inverter 10, and this DC voltage can be supplied at the DC voltage terminal 11. If a required deceleration torque on the electric machine 2 can already be set by feeding a corresponding DC voltage into the DC voltage source 3 between the central terminal M and the second connection point A2, then the kinetic energy of the electric machine 2 can be entirely fed into the DC voltage source 3 (subtracting the electrical losses). In particular at high speeds, at least some of the electrical energy can be converted into thermal energy over the electrical resistor R between the central terminal M and the first connection point A1. Thus, an electric voltage can be output between the first connection point A1 and the second connection point A2, which voltage is higher than the permissible charging voltage for feeding electrical energy into the DC voltage source 3. In this way, a sufficiently high deceleration torque can be achieved even at higher speeds of the electric machine 2. For example, above a predetermined limit speed, half of the electrical energy can be fed into the DC voltage source 3 and half can be converted into thermal energy over the electrical resistor R. In addition, however, any other ratios for dividing the electrical energy at the DC voltage terminal 11 are also possible, depending on the application.

For example, the control device 15 can also sense any other suitable operating parameters of the electric drive system and/or the DC voltage source 3, in particular a traction battery. Accordingly, the control device 15 can take these operating parameters into account when dividing the electrical energy between the DC voltage source 3 and the electrical resistor R. If, for example, due to the current temperature or charge state of a traction battery, no amount or only a limited amount of electrical energy can be fed into the traction battery 3 between the central terminal M and the second connection point A2, the inverter 10 can convert a correspondingly higher proportion of the electrical energy into thermal energy over the electrical resistor R.

Figure 2:
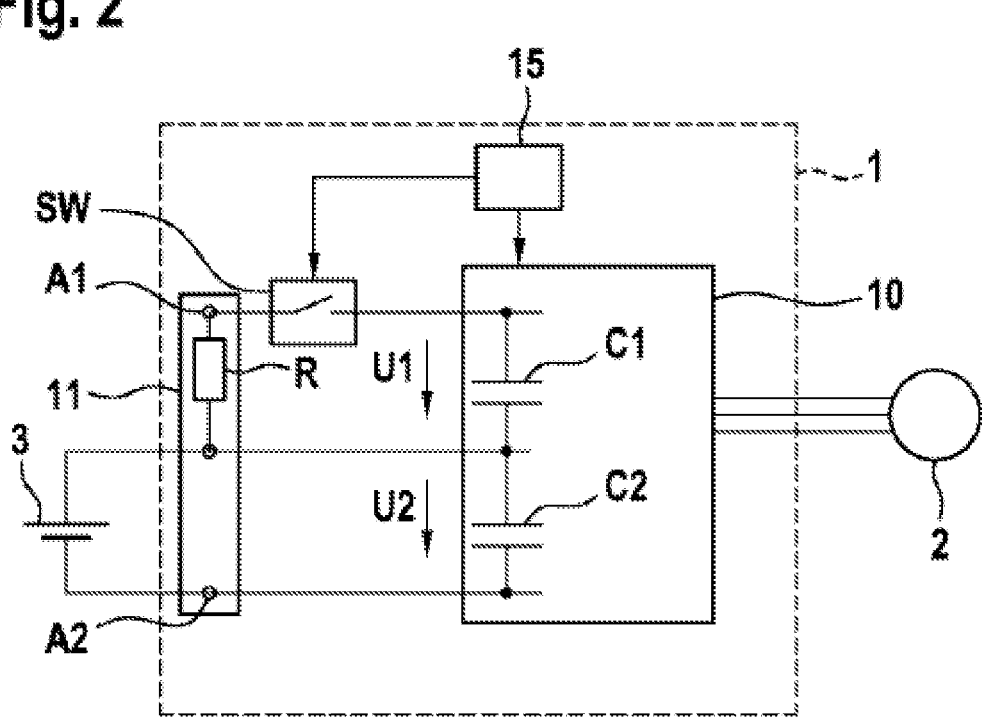
FIG. 2 provides an example illustration of a schematic view of a schematic view of a basic circuit diagram of an electric drive system having a control circuit according to one embodiment.

FIG. 2 shows a schematic view of a basic circuit diagram of an electric drive system having a control circuit 1 according to a further embodiment. The control circuit 1 in this embodiment corresponds as far as possible to the embodiment described above. Accordingly, the previous statements also apply to the embodiment according to FIG. 2.

FIG. 2 differs from the previously described embodiment in particular in that a further switching element SW is provided between the electrical resistor R and the first connection point A1. By opening this switching element SW, it can be achieved that the full intermediate circuit voltage U1 is always applied during operation over the corresponding intermediate circuit capacitor C1. In this way, a correspondingly high deceleration torque can be set especially quickly on the electric machine 2, as needed. Through a modulated actuation of the switching element SW, for example by means of the control device 15, electrical energy can be fed to the electrical resistor R, which is converted into thermal energy in the electrical resistor R. Because a known, sufficiently high intermediate circuit voltage U1 is applied over the intermediate circuit capacitor C1 upon suitable actuation of the switching element SW, it is sufficient to actuate the switching elements of the three-point inverter 10 based on the known intermediate circuit voltages U1, U2 in order to set the desired deceleration torque on the electric machine 2. The regulation of the switching elements can thereby be significantly simplified.

For example, the additional switching element SW can be a semiconductor switching element, e.g. a MOSFET or IGBT.

Figure 3:
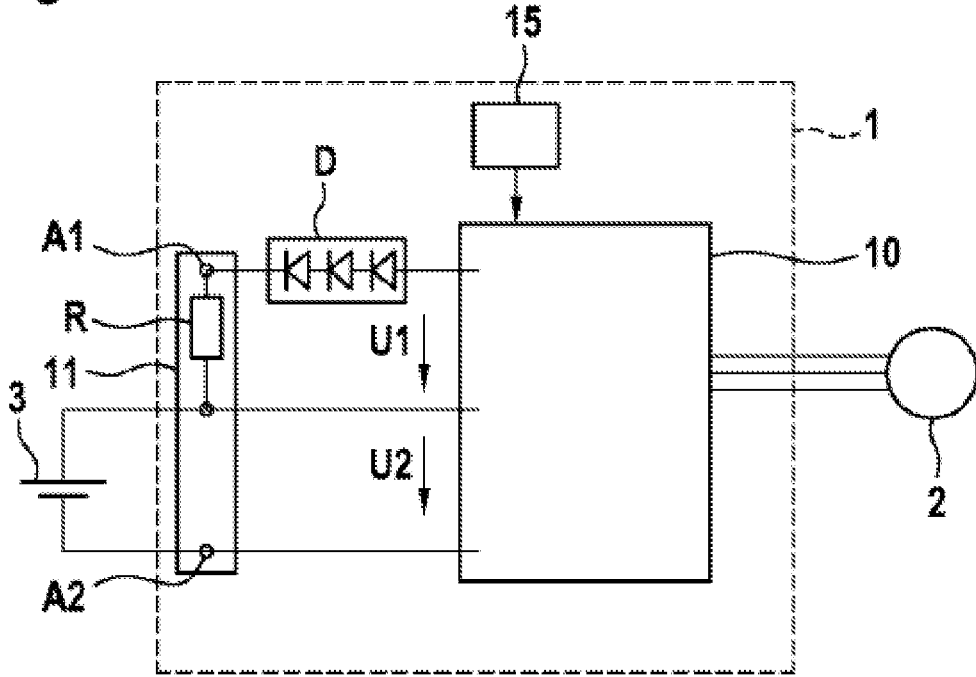
FIG. 3 provides an example illustration of a schematic view of a schematic view of a basic circuit diagram of an electric drive system having a control circuit according to yet another embodiment.

FIG. 3 shows a schematic view of a basic circuit diagram of an electric drive system having a control circuit 1 according to a further embodiment. Again, this embodiment is largely identical to the embodiments described above and differs only in that an assembly with one or more diodes D is provided between the electrical resistor R and the first connection point A1. Beyond this, the statements previously made also apply to the embodiment shown here.

With the at least one diode D between the electrical resistor R and the first connection point A1, it can be achieved that a minimum intermediate circuit voltage U1 is always maintained over the first intermediate circuit capacitor C1. As a result, for example, it can be achieved that the diodes of the inverter 10 always reliably lock even in normal mode.

Figure 4:
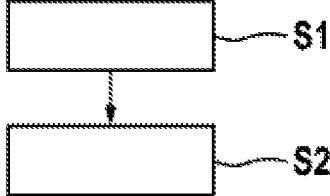
FIG. 4 provides an example illustration of a schematic view of a flow diagram of a method for decelerating an electric machine according to one embodiment.

FIG. 4 shows a schematic view of a flow diagram, as underlying a method for decelerating an electric machine 2 according to one embodiment. To carry out the method, a control circuit 1 according to the embodiments described above is initially supplied in step S1. To decelerate the electric machine, in step S2, the AC voltage supplied by the electric machine 2 at the AC voltage terminal 12 is rectified, and the rectified AC voltage is supplied at the DC voltage terminal 11 of the control circuit 1. At least some of the electrical energy of the rectified AC voltage is supplied at the electrical resistor R between the central terminal M and the first connection point A1.

Moreover, the method can comprise any further steps previously described in conjunction with the control circuit 1 of the electric drive system.

In summary, the present invention relates to a circuit assembly for better decelerating a rotating electric machine by means of a three-point inverter. For this purpose, an electrical resistor is supplied between a central terminal and an outer terminal of the three-point inverter. This electrical resistor allows some of the electrical energy generated during the deceleration of the electric machine to be converted into thermal energy as needed.

The invention claimed is:

1. A control circuit (1) for an electric machine (2), comprising:
    an electrical resistor (R);
    a three-point inverter (10) having a DC voltage terminal (11) and an AC voltage terminal (12), wherein the DC voltage terminal (11) comprises a first connection point (A1), a second connection point (A2), and a central terminal (M), and the electrical resistor is located between the central terminal (M) and the first connection point (A1);
    a control device (15) configured to supply electrical energy in a recuperation mode from the AC voltage terminal (12) at least partially at the electrical resistor (R) between the central terminal (M) and the first connection point (A1); and,
    at least one diode (D) arranged in an electrical path between the first connection point (A1) and the electrical resistor (R),

wherein the three-point inverter includes a first intermediate circuit capacitor (C1) between a central terminal (M) and the first connection point (A1),
    wherein the at least one diode (D) is configured to maintain a minimum intermediate circuit voltage (U1) of the intermediate circuit capacitor (C1),
    wherein the three-point inverter (10) is configured to be connected to an electric machine (2) at the AC voltage terminal (12) and to be connected to a DC voltage source (3) at the DC voltage terminal (11) between the central terminal (M) and the second connection point (A2), and
    wherein the control device (15) is configured to transfer electrical energy from the AC voltage terminal (12) to the electrical resistor (R) when a rotation speed of an electric machine (2) connected at the AC voltage terminal (12) is greater than a predetermined limit value.

2. The control circuit (1) according to claim 1, with a switching element (SW) arranged in an electrical path between the first connection point (A1) and the electrical resistor (R).

3. The control circuit (1) according to claim 1, wherein the control device (15) is configured so as to sense at least one operating parameter of a battery connected between the central terminal (M) and the second connection point (A2) of the DC voltage terminal (11), and
    to adjust an electrical voltage over the electrical resistor (R) using the at least one operating parameter of the battery.

4. The control circuit (1) according to claim 3, wherein the at least one operating parameter comprises at least one charge state or a temperature of the battery.

5. An electric vehicle having an electric drive system according to claim 4.

6. An electric drive system comprising:
    a control circuit (1) according to claim 1; and
    an electric machine (2) electrically coupled to the AC voltage terminal (12) of the control circuit (1).

7. A method for decelerating an electric machine (2), comprising the following steps:
    supplying (S1) a control circuit according to claim 1; and
    rectifying (S2) an AC voltage supplied by the electric machine (2) at the AC voltage terminal (12) and supplying the rectified AC voltage at the DC voltage terminal (11) of the control circuit (1),
    wherein at least some of the energy of the rectified AC voltage is supplied at the electrical resistor (R) between the central terminal (M) and the first connection point (A1),
    wherein at least one diode (D) is arranged in an electrical path between the first connection point (A1) and the electrical resistor (R),
    wherein the three-point inverter includes a first intermediate circuit capacitor (C1) between a central terminal (M) and the first connection point (A1), and
    wherein the at least one diode (D) is configured to maintain a minimum intermediate circuit voltage (U1) of the intermediate circuit capacitor (C1).

8. A control circuit (1) for an electric machine (2), comprising:
    an electrical resistor (R); and
    a three-point inverter (10) having a DC voltage terminal (11) and an AC voltage terminal (12), wherein the DC voltage terminal (11) comprises a first connection point (A1), a second connection point (A2), and a central terminal (M), wherein the electrical resistor (R) is arranged between the central terminal (M) and the first connection point (A1), a control device (15) configured to supply electrical energy in a recuperation mode from the AC voltage terminal (12) at least partially at the electrical resistor (R) between the central terminal (M) and the first connection point (A1), wherein the three-point inverter (10) is configured so as to be connected to an electric machine (2) at the AC voltage terminal (12) and to be connected to a DC voltage source (3) at the DC voltage terminal (11) between the central terminal (M) and the second connection point (A2), wherein at least one diode (D) is arranged in an electrical path between the first connection point (A1) and the electrical resistor (R), wherein the three-point inverter includes a first intermediate circuit capacitor (C1) between the central terminal (M) and the first connection point (A1), and a second intermediate circuit capacitor (C2) between the central terminal (M) and the second connection point (A2), wherein the at least one diode (D) is configured to maintain a minimum intermediate circuit voltage (U1) of the intermediate circuit capacitor (C1), wherein the control device (15) is configured to transfer electrical energy from the AC voltage terminal (12) to the electrical resistor (R) when a rotation speed of an electric machine (2) connected at the AC voltage terminal (12) is greater than a predetermined limit value.

9. The control circuit (1) according to claim 8, with a switching element (SW) arranged in an electrical path between the first connection point (A1) and the electrical resistor (R).

10. The control circuit (1) according to claim 8, wherein the control device (15) is configured so as to sense at least one operating parameter of a battery connected between the central terminal (M) and the second connection point (A2) of the DC voltage terminal (11), and to adjust an electrical voltage over the electrical resistor (R) using the at least one operating parameter of the battery.

11. The control circuit (1) according to claim 10, wherein the at least one operating parameter comprises at least one charge state or a temperature of the battery.

* * * * *